Patented Mar. 29, 1932

1,851,476

UNITED STATES PATENT OFFICE

MAX ZIMMERMANN, OF LEVERKUSEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

DECOMPOSING BERYL

No Drawing. Application filed June 18, 1930, Serial No. 462,150, and in Germany June 28, 1929.

The present invention relates to the decomposition of beryl and beryl containing minerals by means of gaseous hydrofluoric acid.

According to my invention beryl and/or beryl containing minerals are subjected to the action of gaseous hydrofluoric acid at temperatures of between 100 and 900° C. Best results are obtained when working at about 500–600° C. By the decomposition of powdered beryl with gaseous hydrofluoric acid the fluorides of the elements in the beryl are obtained i. e. beryllium fluoride, aluminium fluoride, silicon fluoride. The iron always present in raw beryl is also fluorized, but the firstly formed iron fluoride decomposes at the reaction temperatures and iron oxide remains.

The decomposition proceeds even when the pulverized beryl is exposed to the gaseous hydrofluoric acid in a considerably thick layer, silicon fluoride escapes from the apparatus and the mass becomes a red-brown color by the formation of iron oxide. The reaction is complete when the red-brown color does not change. The reaction mass is poured into water, wherein the beryllium fluoride readily dissolves, while aluminium fluoride and iron oxide remain undissolved. From the filtered solution the beryllium is to be obtained according to known methods, for instance, by precipitating as beryllium hydroxide by means of ammonia.

The following examples are given to illustrate my invention; it is, of course, not restricted thereto:

*Example 1.*—4 parts by weight of bryl containing 12% BeO, 20% $Al_2O_3$, 2% $Fe_2O_3$ and 65% $SiO_2$ are heated in an iron or nickel tube to about 600° C. and gaseous hydrofluoric acid is passed over the mass. The introduction of hydrofluoric acid when no more $SiF_4$ is evolved ($SiF_4$ is detected by introduction of the reaction gas coming from the apparatus into water; $SiF_4$ is decomposed thereby and $SiO_2$ precipitates which settles as a cloudy mass). The reaction mass, which can easily be pulverized is extracted with hot water of about 60–100° C.; from the filtrate the beryllium is precipitated as hydroxide by means of ammonia. The filtrate from the hydroxide can be utilized in the known manner.

*Example 2.*—Beryl is decomposed by means of gaseous hydrofluoric acid which contains equal parts of silicon fluoride (obtained from silicic acid, which is contained as an impurity in calcium fluoride) at about 500° C. in a revolving furnace being lined with aluminium. Since water is obtained in the reaction the silicon fluoride reacts with the water to form hydrofluoric acid and silicic acid, so that also silicon fluoride acts as a fluorating agent.

The working up is effected as indicated in Example 1.

I claim:

1. In the process of decomposing beryl the step which comprises heating beryl with gaseous hydrofluoric acid to a temperature of between 100 and 900° C.

2. Process of decomposing beryl comprising heating powdered beryl in a current of gaseous hydrofluoric acid to a temperature of between 100–900° C. until no silicon fluoride escapes, extracting the reaction mass with water of about 10–100° C., filtering and precipitating the filtrate by means of ammonia.

In testimony whereof, I affix my signature.

MAX ZIMMERMANN.